Dec. 19, 1961 L. D. APT 3,014,097
DIAL CONTROLLED INTERCOMMUNICATION SYSTEMS
Filed March 31, 1959
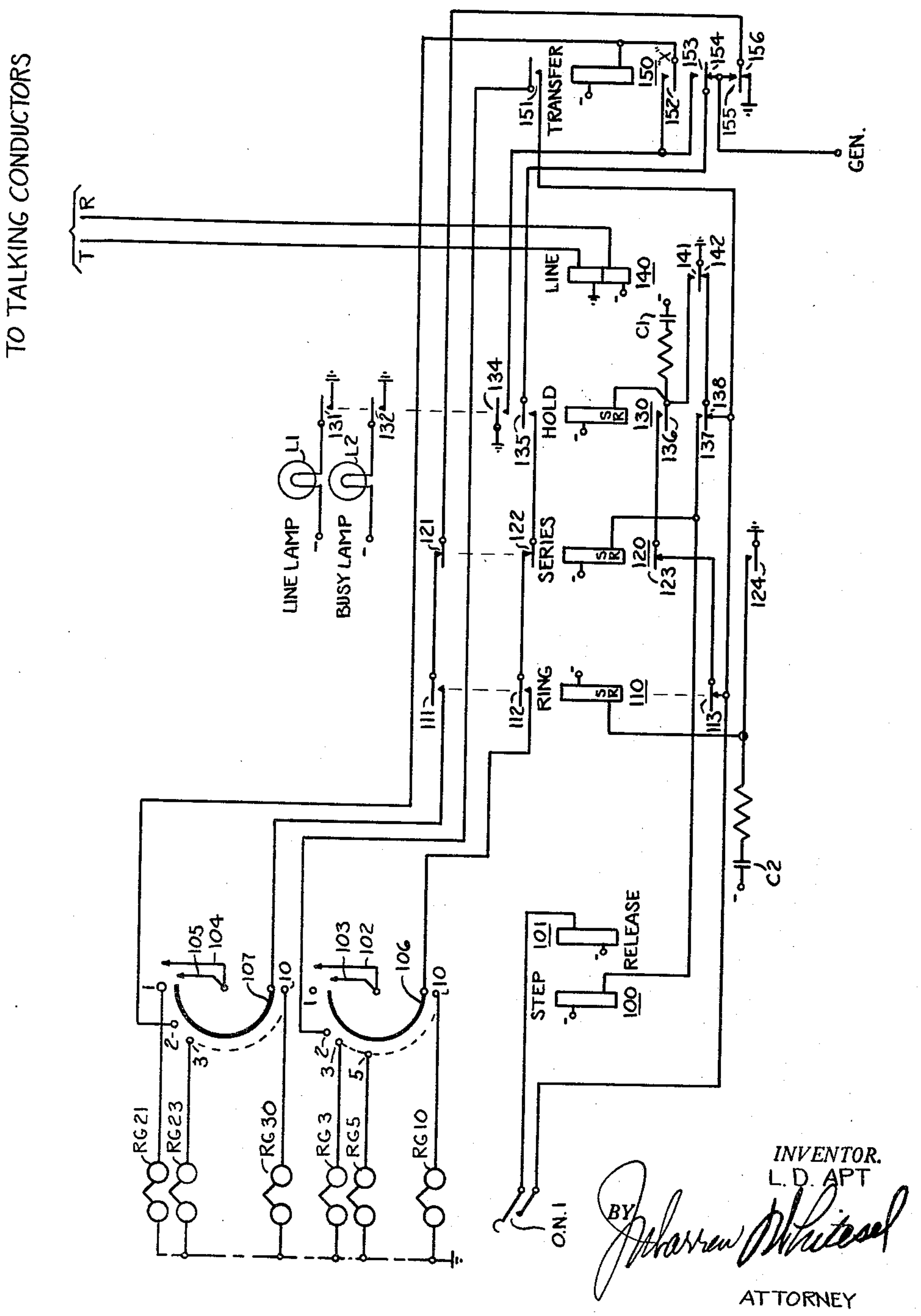
INVENTOR.
L. D. APT
BY
ATTORNEY 3,014,097
Patented Dec. 19, 1961

3,014,097

DIAL CONTROLLED INTERCOMMUNICATION SYSTEMS

Lloyd D. Apt, Tinley Park, Ill., assignor to International Telephone and Telegraph Corporation, New York, N.Y., a corporation of Maryland Filed Mar. 31, 1959, Ser. No. 803,154
1 Claim. (Cl. 179—84)

This invention relates to dial controlled intercommunication systems and more particularly to ringing controls for such systems.

The art of switching telephonic communication lines ranges from complex dial telephone systems of large metropolitan areas to simple, single pushbutton intercommunication equipment. As a generality, there is a gap between conventional telephone systems and intercommunication equipment wherein subscribers either have to accept inferior service or have to install costly telephone systems which are equipped to give a grade of service that is neither required nor used. Therefore, recent developments have produced dial controlled intercommunication systems which are designed to bridge the gap by providing as many telephone features as possible without adding appreciably to the cost of the equipment. Such developments are limited by commercially available components since specially designed equipment would quickly consume the savings of an intercommunication system. For example, standard telephone dials provide for the transmission of only ten numbers, certain minor switches have only ten positions, etc., thus, adding problems when intercommunication systems must serve more than ten subscribers.

An object of this invention is to provide new and improved dial controlled intercommunication systems.

A further object of this invention is to provide for more than ten stations without the addition of a significant amount of equipment.

Still another object of this invention is to provide for signalling called subscribers without requiring complex interrupter equipment.

In accordance with this invention, these and other objects are accomplished by means of a stepping or counting device which responds to a first train of digit pulses either by signalling one of a first group of subscriber lines or by dropping back after which it may be reoperated by a second digit pulse train for signalling additional subscriber lines. Thereafter, a single splash or pulse of signalling current is transmitted for a period of time that is measured by certain slow release relays which restore in sequence.

The above mentioned and other objects of this invention together with the manner of obtaining them will become more apparent and the invention itself will be best understood, by reference to the following description of an embodiment of the invention taken in conjunction with the accompanying single sheet of drawings that shows a signalling circuit of a dial controlled intercommunication system.

Where possible, simple terms are used and specific items are described hereinafter to facilitate an understanding of the invention; however, it should be understood that the use of such terms and references to such items are not to act in any manner as a disclaimer of the full range of equivalents which is normally given under established rules of patent law. To illustrate, the accompanying drawing shows a counting means as a rotary switch whereas a counting chain of relays or gas tubes, etc. may provide a similar function. Quite obviously, other examples could be selected to illustrate the manner in which the specific terms that have been used are entitled to a wide range of equivalents.

*Brief description*

Counting means is provided in the form of a rotary switch having brushes 102–105 which may be stepped in unison responsive to the receipt of digit pulses. If the first digit pulse train indicates any value except a specific value, such as the numeral "2," signal current is transmitted via brushes 102 and 103 to signal a particular subscriber station. On the other hand, if the first digit pulse train represents the numeral "2," brushes 104 and 105 complete a circuit to operate preparing means in the form of transfer relay 150. Responsive thereto, contacts 154 and 155 operate to transfer the signalling conductor "GEN" from its normal associations with contact bar 106 to an association with contact bar 107, thereby preparing for the transmission of ringing current to additional subscriber lines. If transfer relay 150 operates, it indicates that a second digit pulse train will be received and registered on the upper bank of the rotary switch, thereby selecting one of the subscriber stations R21 to R30.

After termination of the first digit, or the second digit if there is transfer, series relay 120 releases to open contacts 124 and thereby de-energize ring relay 110 which, however, continues to be held briefly by discharging current from capacitor C2. Ringing current is transmitted during the time interval while relay 110 is being held after which contacts 111 and 112 open to terminate ringing.

Therefore, it is seen that means is provided for transmitting a single burst of ringing current to some subscriber stations responsive to one digit pulse train and to other subscriber stations responsive to two digit pulse trains.

*Detailed description*

*Seizure.*—The circuit is seized when a loop is completed over conductors T and R to operate line relay 140, over a circuit extending from ground through the upper winding to conductor T, a loop (not shown) to and from the calling subscriber station, conductor R and the lower winding of relay 140 to battery.

When relay 140 operates, contacts 141 close to charge capacitor C1 and to operate hold relay 130, both functions being completed over obvious circuits.

Responsive to the operation of relay 130, contacts 131 close to light line lamp L1 and contacts 132 close to light busy lamp L2 as an indication that a call is in progress.

Parenthetically, it is noted that no means is shown in the drawing for sending dial tone since, as a matter of economy, the calling party is instructed to wait a moment after removing his receiver and then to dial. If it is desirable to provide dial tone, it is within the contemplation of the invention to provide contacts controlled by hold relay 130 for causing the transmission of dial tone, in a conventional manner, at this time. Contacts 135 close to prepare a signalling circuit which will be explained later. Contacts 134 and 137 close but have no effect at this time.

The circuit is now ready to receive dial pulses and nothing further happens until they are received.

*One digit control.*—The calling subscriber operates any suitable signalling device (not shown) such as a dial or a key set, for example, to transmit digit information in the form of "loop pulses." That is to say, a connection between conductors T and R is opened and closed a number of times depending upon the value of the digit that is dialed. Responsive to each pulse, line relay 140 releases and reoperates to open and close contacts 141 and 142. Hold relay 130 depends upon its own slow release characteristics to hold it operated throughout digit pulsing. When contacts 142 close responsive to receipt of the first digit pulse, relay 120 operates over a circuit extending from battery through the winding of relay 120, contacts 137 and 142 to ground. During the time between digit pulses while contacts 142 are open, series relay 120 holds operated due to its own show-release characteristics; however, it will release after the end of the digit pulse train.

Responsive to the operation of series relay 120, contacts 121 and 122 open to break the paths which are used later during the call to conduct signalling current to a called subscriber. Contacts 123 open the operate path to release magnet 101. Contacts 124 close to operate ring relay 110 and to charge capacitor C2 over obvious circuits.

Responsive to the operation of ring relay 110, contacts 111 and 112 close to prepare for signalling and contacts 113 open also to forestall any operation of release magnet 101 at this time.

The next circuit operation depends upon the numerical value of the digit that is received. If the numeral "2" is indicated, the call is to be completed responsive to two digit pulse trains. Receipt of any other digit indicates that the call is to be completed responsive to a single digit pulse train.

First, it is assumed that anything except the digit "2" is received—the digit five, for example. Line relay 140 releases and reoperates five times. Responsive to each digit pulse, contacts 142 close to complete a circuit through contacts 137 and the winding of step magnet 100 to battery. Since magnet 100 is energized five times, brushes or wipers 102–105 are advanced to the fifth step.

At the end of the digit pulse train, line relay 140 stops pulsing and is held operated by the loop across conductors T and R; hence, contacts 142 remain open for a period of time that is longer than the slow release time of series relay 120 which, therefore, releases.

*Ringing.*—Responsive to the release of relay 120, contacts 121 close; however, there is no effect since contacts 155 are open and contacts 156 are connected to ground. Contacts 124 open to de-energize ring relay 110 which, however, continues to be held for a period of time that is measured by discharging current from capacitor C2. During such time, a circuit is completed from the conductor marked "GEN" through contacts 154, 135, 122, 112, contact bar 106, brushes 103 and 102 and associated terminal 5 to ringer RG5 and ground. The called subscriber is signalled responsive to ringing current continuously applied via conductor "GEN." After a period of time measured by the discharging of capacitor C2, ring relay 110 releases to open contacts 112, thus ending the transmission of signalling current to the called subscriber. In this manner, the called subscriber hears a single burst of ringing from ringer RG5.

*Two digit control.*—Next, it is assumed that the first digit is the numeral "2." Responsive to receipt thereof, line relay 140 releases and reoperates two times to open and close contacts 142 twice, and in turn to operate step magnet 100 twice thereby driving brushes 102–105 two steps. After series relay 120 releases, a circuit is completed from battery through the winding of transfer relay 150, upper terminal "2" and associated contact bar 107 via brushes 104 and 105, contacts 111, 121, and 156 to ground.

Transfer relay 150 operates first its "X" or preliminary contacts 152 to lock over the circuit extending from battery through the winding of relay 150, contacts 152, and 134 to ground. Thereafter, transfer relay 150 closes its other contacts 151 and 153–156. The counting device or rotary switch brushes 102–105 are released responsive to completion of a circuit extending from battery through the winding of release magnet 101, off-normal contacts ON1, contacts 151, lower bank terminal "2" and contact bar 106, via brushes 102 and 103, contacts 112, 122, 135, 153 and 134 to ground. The circuit for transmitting signalling current is switched from contacts 154 and 156 to contacts 153 and 155. Thus, the control of ringing current is transferred from the lower to the upper terminal banks of the rotary switch.

It makes no difference at this time whether ringing current is or is not projected over the rotary switch bank since there is no ringer connected to either terminal "2"; however, the operation of release magnet 101 and the resulting release of the rotary switch (as explained above) is quick enough to eliminate the transmission of ringing current, as a practical matter.

The circuit is now standing ready to receive the next digit pulse train and nothing further happens until the calling subscriber dials. Responsive to the receipt of each digit pulse, line relay 140 releases and reoperates to drive the counting device or rotary switch as explained above. For example, if it is assumed that the digit "3" is received, brushes 102–105 are driven to the associated terminal marked "3"; however, unlike the last time, transfer relay 150 has operated thus causing signalling current to be transmitted under the control of the upper bank in the rotary switch.

*Ringing.*—Continuous ringing current is transmitted via a circuit which may be traced from the conductor marked "GEN" through contacts 155, 121, 111, contact bar 107, brushes 104 and 105, contacts "3" and an associated ringer RG23 to ground. Therefore, it is seen that the third terminal in the upper bank is associated with a subscriber having the directory number "23."

When ring relay 110 releases as explained above in connection with one digit control, contacts 111 open and the transmission of ringing current is terminated. Thus, the called subscriber has heard a single burst of ringing for a period of time which is measured by the discharging of capacitor C2.

Conversation follows, talking battery being furnished by battery and ground supplied through the windings of line relay 140.

At the end of the call, the talking loop is broken at the hookswitch contacts of the conversing subscribers. Responsive thereto, line relay 140 releases and the circuit restores in a conventional manner.

While the principles of the invention have been described in connection with specific apparatus, it is to be clearly understood that this description is made only by way of example and not as a limitation to the scope of the claim.

I claim:

A dial controlled intercommunication system comprising a plurality of subscriber stations, means including a line relay connected to operate responsive to the receipt of digit pulse trains, a two-bank stepping switch, means controlled by said line relay for driving said stepping switch to register on one of said banks the numerical value of a first digit pulse train as it is received, means responsive to the registration of any of said numerical values except one for transmitting ringing current to signal a selected subscriber station only during a measured time interval, a single transfer relay, means responsive to the registration of said one numerical value for operating said transfer relay, means responsive to operation of transfer relay for releasing said stepping switch and for effectively switching from said one bank to the other of said banks, means thereafter responsive to the receipt of a second digit pulse train for driving said stepping switch to register the numerical value thereof on said other bank, and means responsive to the registration of said second digit pulse train when said transfer relay is operated for transmitting ringing current to a selected station only during a measured time interval.

References Cited in the file of this patent

UNITED STATES PATENTS

| | | |
|---|---|---|
| 1,541,387 | Polinkowsky | June 9, 1925 |
| 1,665,466 | Middleton | Apr. 10, 1928 |
| 2,688,738 | Bellamy | Sept. 7, 1954 |